May 13, 1941.   H. H. SCHMIDT   2,241,425
APPARATUS FOR VAPORIZING AND SPRAYING THICK LIQUIDS
Filed Dec. 21, 1936    2 Sheets-Sheet 1

INVENTOR
HERMANN H. SCHMIDT
BY *Alfred R. Fuchs*
ATTORNEY

INVENTOR
HERMANN H. SCHMIDT
BY Alfred R. Fuchs
ATTORNEY

Patented May 13, 1941

2,241,425

UNITED STATES PATENT OFFICE 2,241,425

APPARATUS FOR VAPORIZING AND SPRAYING THICK LIQUIDS

Hermann Henry Schmidt, Hanover, Kans., assignor to The Universal Royalty and Development Company, St. Joseph, Mo., a corporation of Missouri Application December 21, 1936, Serial No. 116,923

10 Claims. (Cl. 299—63)

My invention relates to an apparatus for reducing the viscosity of thick viscous materials, such as heavy liquids, and to prepare and condition such heavy viscous liquids, or heavy powders, for spraying.

It is a particular purpose of my invention to provide an apparatus of the above mentioned character, which does not require the application of heat to the heavy viscous liquid to increase the fluidity thereof. While it may be found desirable to warm the heavy viscous material to permit the flowing of the same into the apparatus when the temperature of the atmosphere is such that the viscosity of the material is so great that it will not flow at all, yet this warming would have no effect on the final viscosity of the material, whereas my improved apparatus permanently decreases the viscosity of the material so that even though the temperature thereof may be the same it will be more mobile, or more fluid, than was the case prior to treatment. The increase in mobility or fluidity will be very considerable in the case of heavy viscous materials.

More particularly my invention comprises a centrifugal apparatus in the form of a rotor, that operates at a relatively high rate of rotation, and that is so constructed as to exert a centrifugal action on the material that is being supplied to the apparatus so as to throw the same violently outwardly toward the periphery of the rotor and beyond the same into engagement with the wall of a chamber in which the rotor is located, said chamber being in the form of a casing that is provided with walls closely adjacent the rotor, said apparatus thus not only increasing the fluidity, or mobility, of the heavy viscous material, but breaking the same up and reducing the same to a fine mist, which is adapted to be discharged from the apparatus in the form of a fine mist-like spray.

More particularly it is a purpose of my invention to provide apparatus of the above mentioned character, in which the rotating means, or rotor, comprises partition means dividing the casing into chambers on opposite sides of said partition means, in an axial direction, and the periphery of which is spaced from the casing with agitating means in each of said chambers rotating at a relatively high rate of speed, and projecting members on said rotating means located in the space between the periphery of the partitioning means and the casing to agitate and break up the viscous material that has been thrown out into the space between the periphery of said partitioning means and the casing by the agitating means on opposite sides of said partitioning means.

My invention is particularly adapted to the placing of thick liquids, such as molasses, for example, in condition to be sprayed in such operations as the treatment of feeds and the like, and may be further utilized for placing other heavy thick fluids, or powders, into condition to be sprayed, or to convert any liquid, or powder, into a mist-like form so that the same can be intimately mixed with other similarly treated liquids, or powders, and after such treatment, utilized either in the form of a spray or in any other form desired, a very thorough mixture of various difficult-to-mix ingredients being thus possible and the fluidity, or mobility, of any such as contain a thick liquid of high viscosity will be increased by such treatment so that the material resulting will be much more readily workable than was the case prior to treatment.

It is a purpose of my invention to provide a simple, inexpensive, and highly efficient and reliable apparatus of the above mentioned character, wherein molasses, or other thick viscous fluids, or liquids, or powdered materials, may be introduced into the same either alone or in combination with each other and be discharged from the same by means of the centrifugal force that is acting upon the same to turn the same into a mist-like form, the material being discharged in the form of a mist-like spray adapted to be applied to other materials directly in the form in which the same is discharged from said apparatus.

It is a further purpose of my invention to provide means for controlling the amount of said liquid, or powder, to be fed to said apparatus and to provide discharge means from the same, whereby the centrifugal force created by said apparatus is utilized to spray the material, that has been treated by said apparatus to reduce the viscosity thereof, onto grain, or other material, that is to be coated therewith.

The material that had the high viscosity when fed into the apparatus is acted upon so as to reduce the viscosity thereof, by the action of said rotatable means in cooperation with the casing, the centrifugal whirling, or whipping action, of the rotor, or rotatable means, in the case of molasses, or similar material, changing the characteristics of the same by breaking down the fibre tissue and gum contained therein, as well as apparently producing a partial crystallization of the sugars remaining therein to produce a material that has a lighter color and a much lower viscosity and much less stickiness than the material that was fed into the apparatus. Similar changes occur in practically all heavy viscous materials fed into the same.

Other objects and advantages of my invention will appear as the description of the drawings proceeds. I desire to have it understood, however, that I do not intend to limit myself to the particular details shown or described, except as defined in the claims.

Figure 1:
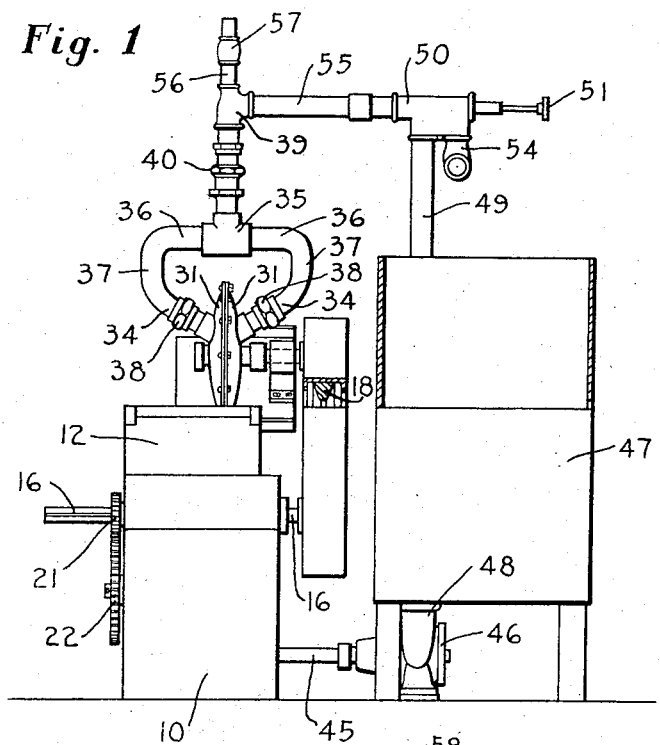
Fig. 1 is a view partly in end elevation and partly in section of my improved apparatus as utilized for spraying molasses, or similar material, on grain, or other material, that is to be fed into the spray produced by my rotatable conditioning means, the section being taken substantially on the line 1—1 of Fig. 2.
Figure 8:
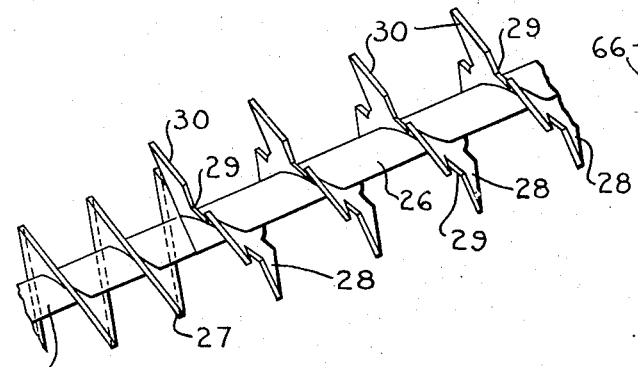
Fig. 8 is a fragmentary view in side elevation of the conveyor means employed in the apparatus shown in Figs. 1 and 2.
Figure 9:
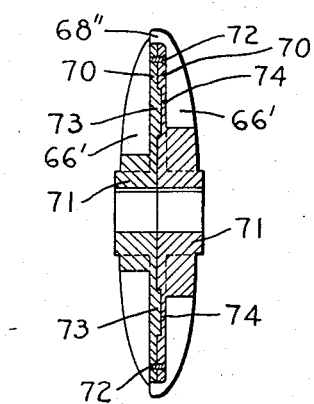
Fig. 9 is a vertical axial sectional view through a further modified form of rotor.

Referring in detail to the drawings, my improved apparatus is shown as being set up for preparing molasses, or similar material, for spraying on grain, or similar material, and for spraying said conditioned molasses on said grain, and agitating the grain, upon which the molasses is to be sprayed, while such spraying is taking place. It is, of course, to be understood that the combined spraying means and means for conditioning the viscous material can be employed in many other ways. The apparatus shown in Figs. 1, 2 and 8, however, is particularly adapted for spraying molasses on grain, or similar material, without pre-heating the molasses to put the same in condition for spraying, and comprises a base portion 10 from which the conveyor housing 11 extends to any desired extent to any suitable means for discharging the treated grain in any preferred manner into any desired container or other apparatus.

Mounted upon the base is a hopper 12 for grain, or other dry material, that is to be sprayed with the molasses, or similar fluid. Said hopper is provided with an adjustable gate, or slide, 13, which has any suitable means 14 thereon for moving the same in and out on its guideways 15 to adjust the feed opening from the hopper into the conveyor housing 11. Said feed may be regulated in any other desired manner. Mounted in any suitable manner in bearings on the base member 10 is the main drive shaft 16, which is provided with a pulley 17, over which the belt 18 operates, said belt 18 operating over a pulley 19 provided on the shaft 20 of the centrifugal conditioning apparatus. A guard 52 of sheet metal may be provided for the belt 18. The shaft 16 also is provided with a gear 21, which meshes with the gear 22 on a stub shaft 23, which is provided with a bevel gear 24 meshing with the bevel gear 25 that is fixed to rotate with the conveyor shaft 26. On said conveyor shaft is mounted a conveyor made up of a feed screw portion 27, which merely carries the material fed from the hopper 12 forwardly and upwardly toward the spraying zone and the spiral conveying and mixing means 28, which is made up of a cut flight spiral portion interrupted at 29 to form blades 30 that collectively form means for agitating and mixing the materials being carried forward by the conveyor and for carrying said materials forwardly and upwardly toward the discharge end of said conveyor past the spraying means to the point of discharge thereof from said apparatus.

My apparatus comprises a casing, preferably made up of a pair of casing portions 31, that are provided with flanges 32, through which the securing elements 32' extend to secure the halves of the casing together in fluid-tight relationship. Each casing portion 31 is provided with an inlet passage 33, to which the inlet conduits 34 are connected, said inlet conduits being branches of a piping system extending from a T 35, first in an outward direction at 36 and then in a downward direction at 37 to the inclined portions 34 that are connected with the inlet connections 33 by any suitable means, such as the unions 38. It will be obvious that the yoke-like conduit having a pair of arms extending into each casing section, can be swung on the T 35 to obtain any angular position of the casing 31 that may be desired. The T 35 is connected with the T 39 by any suitable conduit means, such as pipe nipples, of the desired length, but is, preferably, provided with a slip joint 40 of standard construction so as to enable the adjustment of the position of the casing in a vertical direction. The shaft 20, it will be noted, is mounted in suitable bearings on the members 41, which are bolted to a plate 42 that is adjustable by means of the adjustable connections 43 on the conveyor housing. It will be obvious that with the pipe connections provided, any desired position of the casing 31 can be obtained to get the desired discharge of the spray therefrom onto the material that is being carried forward by the conveyor means 27 and 28, it being obvious that the casing is cut away at the lower portion thereof, as shown at 44, to provide a discharge opening of large capacity, at the bottom of the same, the cut away portion being inclined upwardly, as will be clear from Figs. 2 and 3.

A countershaft 45 is provided, which is driven by any suitable gearing from the shaft 23, and which drives a pump 46 of any desired character located below the tank 47 and receiving the heavy viscous fluid from the tank 47 through the outlet connection 48. Said pump elevates said heavy fluid material, such as molasses, through the pipe, or conduit, 49 to a control valve 50 for proportioning the amount of the heavy viscous material to be fed to the casing 31, a suitable handle 51 being provided for adjusting the regulating valve 50 as may be desired. Inasmuch as the pump 46 operates at a constant rate, the regulating valve 50 is provided with an overflow connection 54, which returns any excess material that will not pass through the valve 50 to the tank 47. A conduit, or pipe, 55 connects the valve 50 with the T 39. A branch conduit 56 is provided, extending upwardly from the T 39, which is provided with a valve 57, from which a conduit 58 extends to any desired point, said valve 57 being utilized for supplying any desired material passing through the conduit 58 to the casing 31, it being obvious that the proportion of powdered or similar material fed may be regulated by means of said valve or otherwise. If desired, air may be admitted through the valve 57, or powdered material, or other liquid, that it might be desired to mix with the liquid passing through the regulating valve 50, or the heavy viscous material may be admitted to the apparatus by gravity, if desired, through a valve 57 or a regulating valve 50 from a tank located at a higher level than the T 39.

The shaft 20 has the rotor mounted thereon within the casing formed of the casing sections 31, so that the same is fixed to the shaft 20 to rotate therewith, this being accomplished in any desired manner, such as by keying the rotor to the shaft 20. Said rotor comprises a hub portion 59 fitting the casing closely, but sufficiently spaced therefrom that there will be substantially no frictional contact between the ends of said hub portion 59 and said casing. Said casing is provided with outwardly projecting bosses 60 serving as bearing portions for the shaft 20 and threaded at 61 to receive the packing nuts 62 and 63 for compressing the packing material 64 so as to prevent leakage of the fluid out around the shaft.

Figure 3:
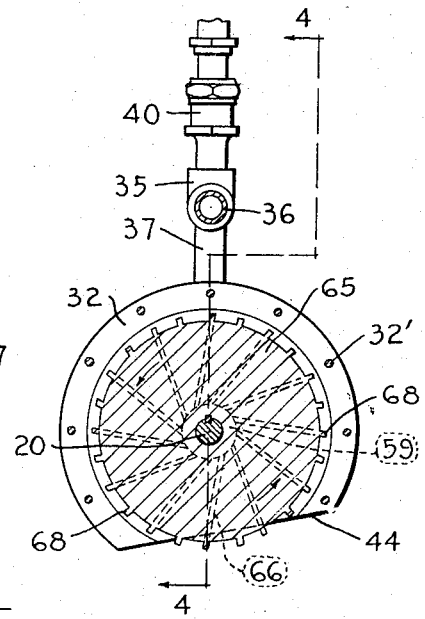
Fig. 3 is a central vertical sectional view through my improved centrifugal apparatus, the upper portion of the feeding conduits being broken away, and the view being taken substantially on the line 3—3 of Fig. 4.
Figure 4:
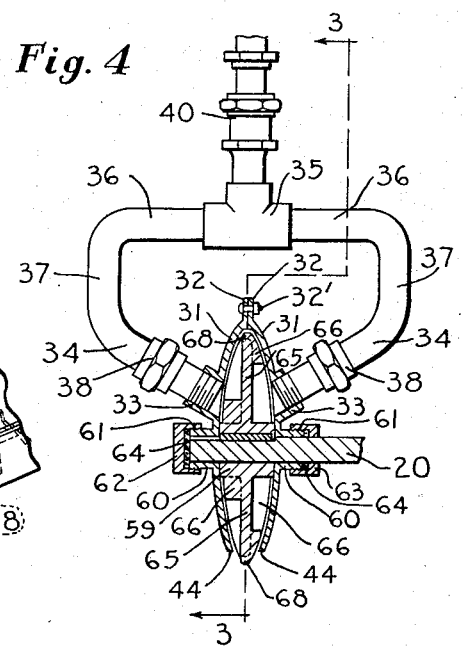
Fig. 4 is a section taken substantially on the line 4—4 of Fig. 3.

The rotor comprises, in the preferred form of the invention, a disk-like central web portion 65 extending from the hub portion 59 outwardly toward the inner periphery of the casing 31, but spaced therefrom a slight distance, as will be evident from Figs. 3 and 4. It will be noted that the casing portions 31 are curved inwardly toward each other so as to form a gradually narrowing chamber from the axis of rotation of the shaft 20 outwardly to the annular peripheral edge at the flanges 32, having concavely curved annular walls. The disk-like partitioning member 65 on the rotor is provided with vanes, or fangs, preferably made in the form of ribs 66 cast on the disk 65, said vanes, or fangs, being tallest adjacent the hub portion 59 and having a gradually tapering form, the edges thereof being shown as being curved to conform to the curvature of the inner faces of the portions 31 of the casing and extending closely adjacent said inner faces of the casing so as to just clear the same when the rotor is rotating within the casing.

Figure 2:
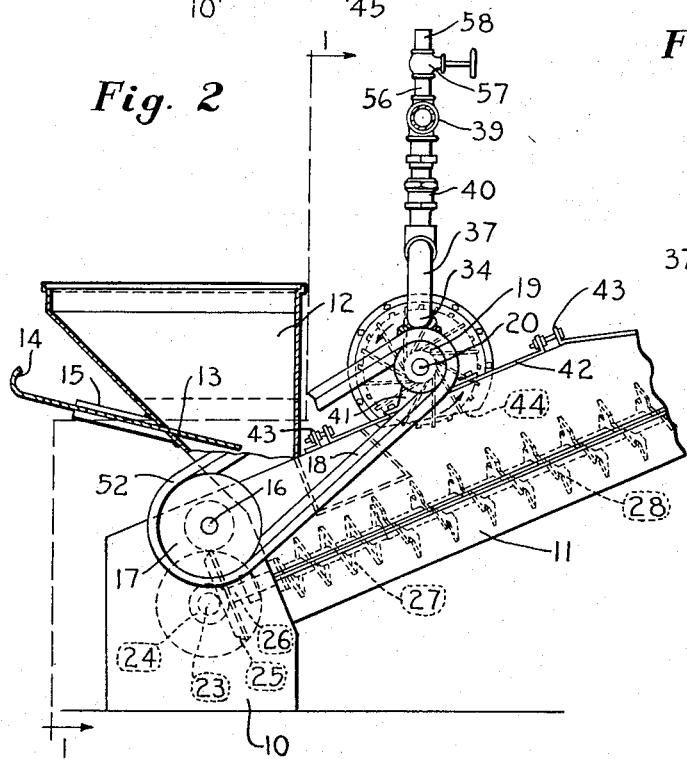
Fig. 2 is a fragmentary view in side elevation partly broken away, of the apparatus shown in Fig. 1, the feeding hopper for the grain, or similar material, being partly in section.
Figure 5:
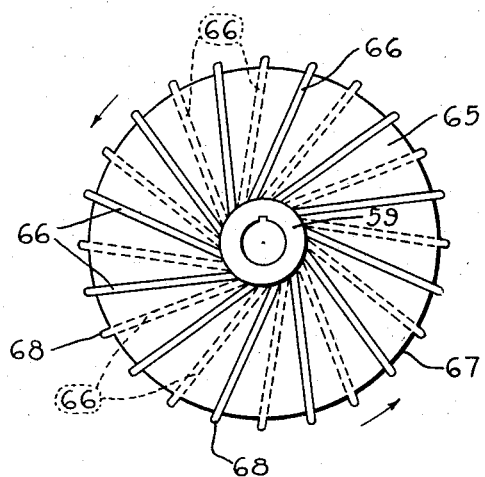
Fig. 5 is a view in side elevation of the preferred form of rotor employed in my apparatus.
Figure 6:
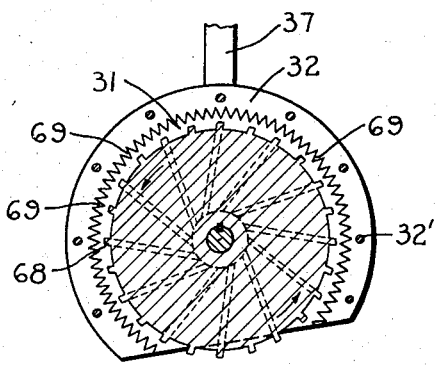
Fig. 6 is a fragmentary view, showing the rotor in central vertical section, of a slightly modified form of apparatus.

It will be noted that the rib-like members 66 on said rotor extend outwardly in a non-radial direction, extending at a somewhat acute angle to the radius in a backward direction from the hub to the periphery of the disk, the direction of rotation of the rotor being indicated by the arrows in Figs. 2, 3 and 5, and the angularity relative to the radius shown for the ribs 66 in the form of the invention illustrated being slightly less than 45 degrees, although it is obvious that the angularity can be varied from this, should it be found that a somewhat different angle will increase the efficiency of the apparatus. Said rib-like members 66 extend outwardly beyond the peripheral edge 67 of the disk-like member 65 so as to form breaker members, or fangs, 68 extending transversely across the periphery of the disk-like member 65 in the form of slightly rearwardly inclined transverse ribs, or vanes, on said periphery, said ribs, or vanes, 68 extending closely adjacent the casing 31 so as to just allow clearance between the casing and the outer edges of said ribs 68. It will be noted that due to the staggered arrangement of the rib-like members 66 on opposite sides of the disk-like member 65 there are twice as many rib-like members 68 on the periphery of the disk-like member 65 as there are rib-like members on each face of the disk 65, this being desirable in order to increase the agitating, whipping and breaking effect of said rib-like members at the periphery of said disk, whereby the highly viscous material is reduced in viscosity and turned into a mist-like spray.

In the form of the invention shown in Figs. 1 to 5, inclusive, which is the form at present preferred, the agitator members, or vanes, 66 centrifugally whirl or whip the material fed into the inlets 33 so as to violently throw the same outwardly against the walls of the casing made up of the members 31, and due to the curvature of said walls 31 said material will tend to be forced across the outer periphery of the disk-like member 65 in an axial direction to engage with the opposite wall of the casing 31 where it will meet the material being thrown centrifugally outwardly in a similar manner, and transversely in a similar manner by the vanes, or rib-like members, on the opposite sides of the disk-like member 65, said material thus thrown outwardly and transversely being engaged by the transverse, slightly rearwardly inclined, rib portions 68 on the periphery of the disk-like member to further break up and agitate the same, throwing the same about between said rib-like members and said casing to break the same up into a fine mist-like form and permanently reducing the viscosity of said material. The material thus vaporized, or made into a mist-like form, is discharged through discharge openings 34, by the centrifugal force created by the rapidly rotating rotor, onto the material that is being agitated and moved forwardly under the same, as will be obvious from Fig. 2, said rotor extending outwardly through the opening 44, as will be clear from Figs. 2, 3 and 4.

To obtain a further breaking and disintegrating action on the highly viscous material, it may be found desirable to provide the casing portions 31 at the annular peripheral inner edge of the flange portions 32 with inwardly projecting portions 69 in the form of tapering ribs or teeth, which just clear the transverse ribs 68, the spacing of the ribs 69 being shown as being considerably closer than the ribs 68, although these may be more closely or more widely spaced, or larger or smaller, if found desirable.

Figure 7:
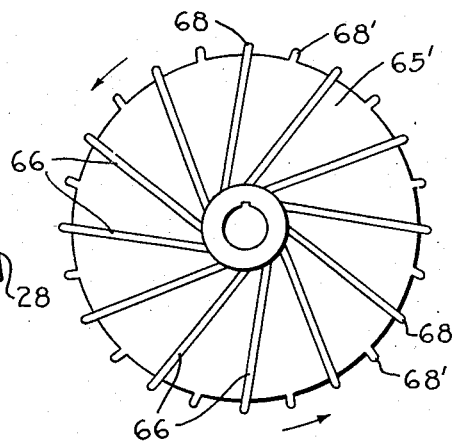
Fig. 7 is a view in side elevation of a modified form of rotor.

For certain purposes it is not absolutely necessary that the vanes 66 be staggered on opposite sides of the disk-like member 65, as shown in Fig. 5, but the vanes 66 may be directly opposite each other on opposite sides of the disk-like member, as is the case with the disk-like member 65' shown in Fig. 7, the rib portions 68' being provided on the periphery of the disk-like member 65', similar to the rib portions 68 and alternating therewith so as to provide a larger number of agitator members on the periphery of the disk than on the side faces thereof.

Instead of making the rotor of a single disk, the same can be made of a pair of disk-like members 70, which are provided with hub portions 71, and each of which is provided with ribs, or vanes 66' that are similar to the ribs, or vanes, 66, the same terminating in transverse portions forming the vanes, or ribs, 68'', which are similar to the transverse ribs, or vanes, 68 on the periphery of the disk 65 or 65'. Said disk-like members are secured together by any suitable securing elements 72 in face to face relation and are provided with interfitting projections 73 and recesses 74 for holding the two halves of the rotor from relative rotation when in position on a shaft, taking shearing stresses that might otherwise be developed, off the securing elements 72.

It has been found with the apparatus described above that the centrifugal whirling motion in the apparatus described breaks down the material, that has been introduced into the same during such whirling, or whipping action, changing the character of certain materials so as to, for example, change the color of a dark liquid, such as black strap molasses, to a lighter color, and in the case of a heavy viscous and exceedingly sticky material, such as molasses, eliminating the stickiness to a certain extent. It is also found that not only is the viscosity of a heavy viscous liquid reduced, but it is expanded, that is, the specific gravity of the product is decreased and in the case of materials that are capable of crystallization, or any that contain ingredients that are capable of crystallization, a partial crystallization of the material appears to take place. Furthermore it has been found that due to the violent agitation and whirling and whipping action of my improved apparatus it provides means for blending and mixing materials much more intimately than would be otherwise possible, particularly materials that are difficult to compound because of some characteristic thereof, such as their heaviness, or high viscosity.

The apparatus can be utilized by discharging the viscous liquid material, while in an atomized or vaporized form, or a liquid and powder in an atomized condition approaching a vapor, to spray, or coat, or impregnate some other material, and can be utilized to spray or coat some other material with a powder in a finely divided form by discharging a powder therefrom in a mist-like spray. The material that has been introduced into the same is changed into a finely divided state, whether actually changed into a vaporous condition or not, no matter what material may be introduced into the same, so long as it is capable of flowing into the apparatus, and this more finely divided condition of the material persists, in the case of a liquid, even after discharge from the apparatus when again turned into a liquid state, the structure of the material evidently having been broken down or changed so as to change the physical characteristics thereof in various respects, such as the specific gravity, fluidity and color. While some loss of moisture, in a viscous liquid evidently occurs during the whipping action, the material is not dehydrated to the extent of dryness, but still has the characteristics of a liquid, whether in the form of a spray, or if collected in a container after discharge, being capable of penetrating into material that will absorb a liquid so as to not merely coat the same, but to impregnate the same inwardly from the surface thereof. The impregnation occurs partly because of the fluidity that the viscous material has acquired due to its treatment by my improved apparatus, and partly due to the force with which it is discharged by the centrifugal action from the discharge opening, or outlet, onto other materials that are to be impregnated with the viscous material that is being treated by the apparatus.

What I claim is:

1. In a machine of the character described, a casing, rotatable means in said casing comprising a disk-like member of smaller diameter than said casing dividing said casing into a pair of closely adjacent communicating chambers axially of said rotatable means, said rotatable means comprising vanes extending continuously from adjacent the center thereof to the peripheral edge thereof and operating in each of said chambers, said vanes extending perpendicularly to said disk-like member and decreasing in height toward the periphery of said rotatable means, inlet means leading into said casing on opposite sides of said dividing means, and means for rotating said rotatable means, said casing having an outlet at its periphery for centrifugally discharging material acted upon by said rotatable means from said casing, said rotatable means projecting through said outlet.

2. A device of the character described comprising a casing, rotary means within the casing for breaking up and increasing the mobility of materials acted upon thereby by converting said materials into the form of a mist, comprising a member partitioning said casing and having agitator members on opposite sides thereof extending from adjacent the center to the periphery thereof to impart centrifugal force to said materials upon rotation of said rotary means, means for introducing said materials into said casing eccentrically thereof on opposite sides of said partitioning member and means for controlling the amount of said material introduced into said casing, said casing having an outlet at the periphery of said casing through which the mist created by said rotary means is discharged of such capacity that the material in said casing is not compressed by rotation of said rotary means.

3. In a machine of the character described, a casing providing a chamber, means for introducing mobile material into said casing, rotatable means in said chamber, and means for rotating said rotatable means, said casing having a discharge outlet, said rotatable means comprising a disk-like member of smaller diameter than said chamber and agitator members on opposite sides of said disk-like member, the agitator members on opposite sides of said disk-like member being staggered.

4. In a machine of the character described, a casing, rotatable means in said casing comprising means dividing said casing into a pair of chambers axially of said rotatable means, said rotatable means comprising vanes operating in each of said chambers, inlet means leading into said casing on opposite sides of said dividing means, means for rotating said rotatable means and means for centrifugally discharging material acted upon by said rotatable means from said casing, said vanes extending beyond the peripheral edge of said dividing means and being staggered on opposite sides of said dividing means.

5. In a machine of the character described, a casing, means for introducing liquid or powdered material into said casing, rotatable means in said casing, and means for rotating said rotatable means, said casing having a discharge outlet, said rotatable means comprising a disk-like member of less diameter than said casing and agitator members on opposite sides of said disk-like member, the agitator members on opposite sides of said disk-like member being in alignment, and extending beyond the periphery of said disk-like member.

6. In a machine of the character described, a casing, means for introducing liquid or powdered material into said casing, rotatable means in said casing, and means for rotating said rotatable means, said casing having a discharge outlet, said rotatable means comprising a disk-like member and agitator members on opposite sides of said disk-like member, and means on said casing and on the periphery of said disk-like member cooperating to agitate and break up said material.

7. In a machine of the character described, a casing, rotatable means in said casing comprising means dividing said casing into a pair of adjacent chambers axially of said rotatable means communicating around the periphery of said rotatable means, said rotatable means comprising non-radial vanes extending from adjacent the axis to the periphery thereof substantially perpendicularly to said dividing means operating in each of said chambers, inlet means leading eccentrically into said casing on opposite sides of said dividing means, means for rotating said rotatable means and means on said rotatable means for centrifugally discharging material acted upon by said rotatable means from said casing, said casing having a discharge outlet at its periphery, said rotatable means projecting through said outlet.

8. In a machine of the character described, a casing having a pair of oppositely dished side walls, rotatable means in said casing comprising a central partition extending perpendicularly to the axis of rotation of said means and dividing said casing into a pair of axially adjacent chambers, said side walls converging toward the periphery of said casing, and said partition being of less diameter than said casing to space the peripheral edge thereof from said casing and provided an annular passage in said casing connecting said chambers, said rotatable means comprising vanes, on opposite sides of said partition, extending continuously from adjacent the axis of rotation of said rotatable means to beyond the peripheral edge of said partition, operating in each of said chambers and in said annular passage, inlet means leading into said casing on opposite sides of said dividing means, said casing having an unrestricted outlet in its peripheral wall leading from said annular passage, and means for rotating said rotatable means to centrifugally discharge material acted upon by said rotatable means through said outlet, said vanes having the edges thereof operating closely adjacent the walls of said casing throughout their length.

9. In a machine of the character described, a casing having a pair of oppositely dished side walls, rotatable means in said casing comprising a central disk-like member extending perpendicularly to the axis of rotation of said means and dividing said casing into a pair of axially adjacent chambers, said side wall having concave inner faces converging toward the periphery of said casing, and said disk-like member being of less diameter than said casing to space the peripheral edge thereof from said casing and provide an annular passage in said casing connecting said chambers, said rotatable means comprising vanes, on opposite sides of said disk-like member, extending continuously from adjacent the axis of rotation of said rotatable means to beyond the peripheral edge of said disk-like member, operating in each of said chambers and in said annular passage, inlet means leading into said casing on opposite sides of said dividing means, said casing having an unrestricted outlet in its peripheral wall leading from said annular passage, and means for rotating said rotatable means to centrifugally discharge material acted upon by said rotatable means through said outlet, said vanes gradually decreasing in height from their inner to their outer ends and having convexly curved edges conforming to the concave faces of said casing and operating closely adjacent the walls of said casing from adjacent the axis of rotation of said rotatable means to the peripheral portion of said casing.

10. In a machine of the character described, a casing, means for introducing liquid or powdered material into said casing, rotatable means in said casing, and means for rotating said rotatable means, said casing having a discharge outlet, said rotatable means comprising a disk-like member of less diameter than said casing, agitator members on opposite sides of said disk-like member aligning with each other and extending beyond the periphery of said disk-like member, and agitator members on the periphery of said disk-like member alternating with the extensions of said agitator members on opposite sides thereof.

HERMANN HENRY SCHMIDT.

CERTIFICATE OF CORRECTION.

Patent No. 2,241,425.                                            May 13, 1941.

HERMANN HENRY SCHMIDT.

It is hereby certified that error appears in the printed specification of the above numbered patent requiring correction as follows: Page 5, first column, line 41, claim 8, for the word "provided" read --provide--; and that the said Letters Patent should be read with this correction therein that the same may conform to the record of the case in the Patent Office.

Signed and sealed this 8th day of July, A. D. 1941.

(Seal)                                        Henry Van Arsdale,
                                                 Acting Commissioner of Patents.